United States Patent Office 3,442,610
Patented May 6, 1969

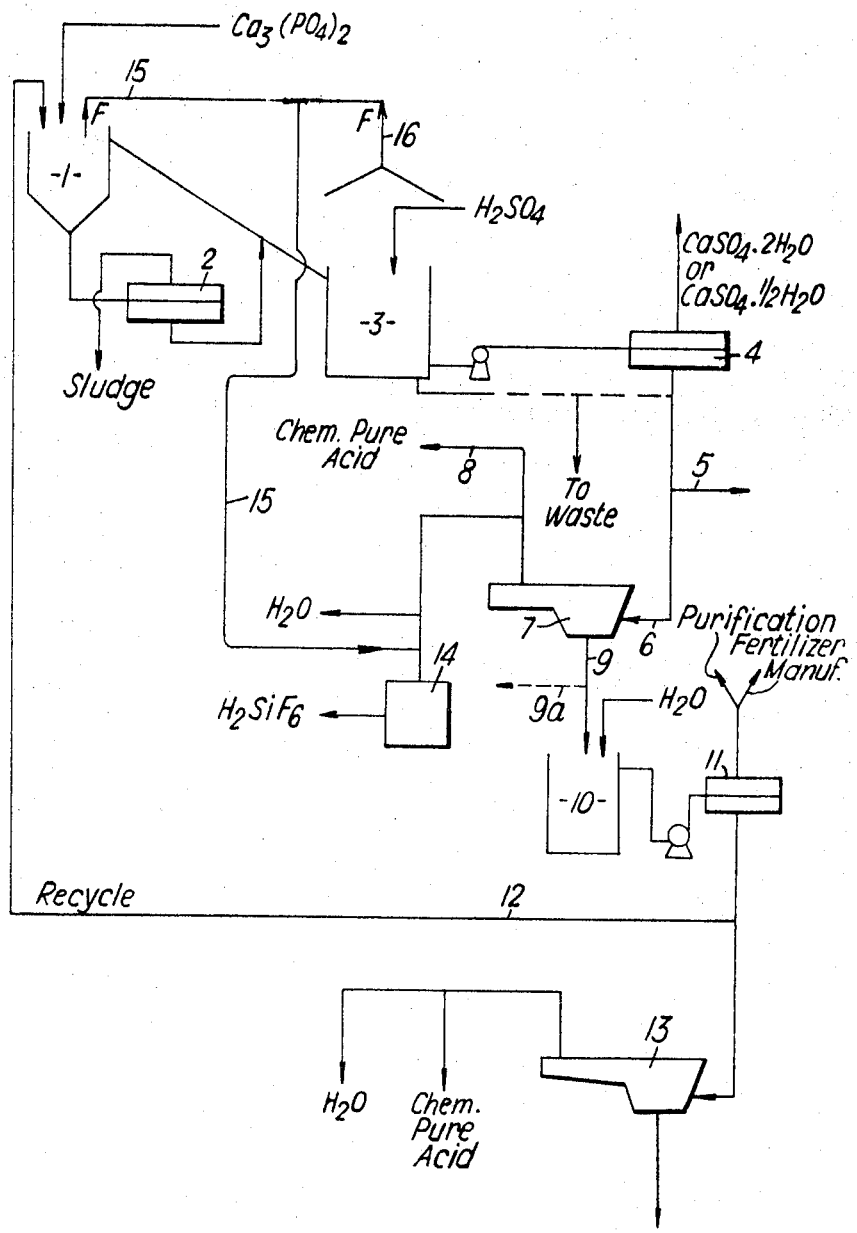

3,442,610
PRODUCTION OF PHOSPHORIC ACIDS
William Roy Mustian, Jr., Lakeland, Fla., and James Austin, Maidenhead, England, assignors to Occidental Research & Engineering Limited, London, England, a British company
Filed Nov. 9, 1965, Ser. No. 507,013
Int. Cl. C01b 25/18
U.S. Cl. 23—165                          1 Claim

ABSTRACT OF THE DISCLOSURE

Process comprising digesting phosphate rock with substantially sulfate-free phosphoric acid to convert the calcium values to soluble mono-calcium phosphate, separating the liquid, adding sulfuric acid to the liquid to convert monocalcium phosphate to calcium sulfate and phosphoric acid and causing calcium sulfate to crystallize, filtering the liquid to separate the calcium sulfate from the phosphoric acid, treating at least part of the filtered phosphoric acid to produce substantially sulfate-free phosphoric acid, and utilizing such acid for the digestion of further phosphate rock.

---

This invention concerns the production of phosphoric acids, including phosphoric acids of high $P_2O_5$ content. For the purposes of this specification, the expression "phosphoric acids of high $P_2O_5$ content" is to be understood as meaning phosphoric acids containing not less than 68% $P_2O_5$ w./w. on an impurity-free basis (IFB) (calculated as the percentage by weight of $P_2O_5$ in relation to the total weight of $P_2O_5$ plus both free and combined water in the acid concerned) and includes the acids known as "superphosphoric acids" having $P_2O_5$ contents in the range 68–79% w./w. (IFB), acids having $P_2O_5$ contents in the range 79–89% w./w. (IFB) which may conveniently be called "astrophosphoric acids" and acids containing in excess of 89% w./w. (IFB), called "ultraphosphoric acids" herein.

The commercial production of phosphoric acids is generally undertaken by one of two general procedures, viz the "wet process" in which bone ash, or more usually, ground phosphate rock, containing apatite $$(3Ca_3(PO_4)_2 \cdot CaF_2)$$

and/or tricalcium phosphate $(Ca_3(PO_4)_2)$ is digested with dilute mineral acid (e.g. sulphuric acid) to produce a weak orthophosphoric acid solution and a calcium salt which is then separated from the solution by an appropriate technique; and the "furnace process." The "wet process" acid is normally produced at low strength (e.g. 27–33% $P_2O_5$ w./w. (IFB)) and although it should desirably be concentrated to higher strengths prior to use in, for instance, the production of fertilizer compositions it is neverthless a very convenient, readily available and economic material for bulk production of fertilizer and other phosphate compositions.

The object of the present invention is to provide a process for the obtaining of phosphoric acids from phosphate rock by a procedure that enables high-purity acid and other products to be economically obtained on a large scale and avoids or substantially reduces certain of the disadvantages and difficulties of procedures involving the conventional wet process.

A further object of the invention is to provide an economic process for obtaining phosphoric acids of relatively low strength, and other valuable products, from phosphate rock, which may readily be integrated with a concentration process to provide an overall process for the obtaining, economically, of phosphoric acids of high $P_2O_5$ content and other vauable products.

In accordance with the present invention, a process for obtaining phosphoric acid from phosphate rock comprises digesting ground phosphate rock with substantially sulphate-free orthophosphoric acid solution in an amount to convert calcium values of the rock to soluble monocalcium phosphate $Ca(H_2PO_4)_2$; separating the liquid from the solid products of such digestion; adding sulphuric acid to such liquid in an amount to convert the monocalcium phosphate content of such liquid to calcium sulphate and orthophosphoric acid and causing the calcium sulphate to crystallize; and filtering the resultant mixture to separate calcium sulphate from the mixture.

In such process, the calcium sulphate, depending upon operating conditions, may be formed either as the dihydrate, gypsum, $(CaSo_4 \cdot 2H_2O)$ the crystals of which are particularly readily filterable from phosphoric acid, or as the hemihydrate $(CaSO_4 \cdot \frac{1}{2}H_2O)$, both of which hydrates are valuable raw materials for, e.g. cement and plaster production. Moreover, because the calcium sulphate is formed by double decomposition in solution, its formation is no hindrance to the preceding and separate solubilization of the phosphorus values of the phosphate rock. In this respect it should be noted that in the conventional wet process, the use of sulphuric acid mixed with orthophosphoric acid for digestion of the ground phosphate rock leads to a slow and incomplete reaction because the calcium sulphate formed in the reaction tends to coat the rock particles and slow the reaction to, effectively, a standstill before its completion; on the other hand, in the process of the invention, the initial digestion with substantially sulphate-free phosphoric acid is rapid and complete.

Moreover, since the gangue is separated prior to the precipitation of the calcium sulphate, the latter is obtained in a relatively high state of purity.

Further, the process of the invention can readily be operated, economically, under conditions such as to produce a phosphoric acid solution of relatively high $P_2O_5$ content, for instance up to 40% w./w., requiring less energy for subsequent concentration to a desired higher $P_2O_5$ content than concentration of the usual wet-process acid to similar $P_2O_5$ content.

The phosphoric acid solution obtained by the process of the invention will contain certain impurities, notably fluorine, sulphur, iron and aluminium compounds, but is capable of concentration to high $P_2O_5$ content, preferably by submerged heater or like techniques. Such acid may for instance be subjected to processes such as disclosed in the specifications of co-pending applications Nos. 440,185 and 471,998.

Preferably, however, the acid solution obtained is employed as a feedstock in the process disclosed in the specification of co-pending application No. 507,012 filed on Nov. 9, 1965 since such process involves the production of a relatively pure, substantially sulphate-free, phosphoric acid solution having a $P_2O_5$ content about 60% w./w. which is a desirable acid for use in performing the initial digestion of the process hereof.

Thus in another aspect, the present invention provides a process comprising digesting ground phosphate rock with substantially sulphate-free orthophosphoric acid in an amount to convert the calcium values of the rock to soluble monocalcium phosphate; separating the liquid from the solid products of such digestion; adding sulphuric acid to such liquid in an amount to convert the monocalcium phosphate content of such liquid to calcium sulphate and orthophosphoric acid and causing the calcium sulphate to crystallize; filtering the resultant mixture; feeding at least part of the filtrate as feedstock to a submerged heater or like evaporator apparatus and concentrating such feedstock to a $P_2O_5$ content not less than about 80% w./w. under conditions such as to promote the formation of insoluble phosphate compounds by impurities in such feedstock; diluting the acid product of such evaporator to filterable viscosity; filtering the diluted product; and utilizing at least a portion of the filtrate for the digestion of further ground phosphate rock.

For the reasons explained in the specification of said application No. 507,012 filed on Nov. 9, 1965, the concentration of the impure feedstock to a $P_2O_5$ content of at least 80% w./w. in the evaporator, followed by dilution and filtration of the acid product of such evaporator leads to a filtrate of high purity which may, if desired, be reconcentrated to high $P_2O_5$ content by any convenient technique.

The reactions that take place in the process of this invention may be summarized as follows:

Digestion

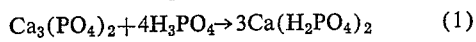

Crystallization

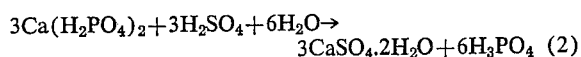

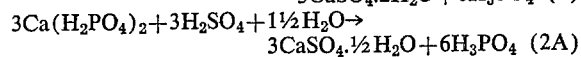

Overall

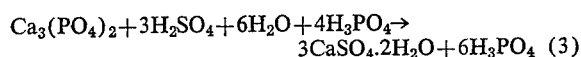

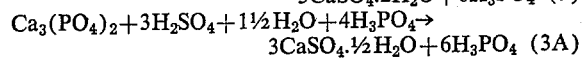

Taking into account the use of the acid produced for performing the digestion, the overall reaction becomes:

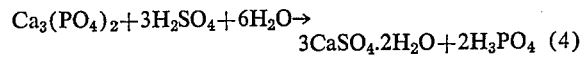

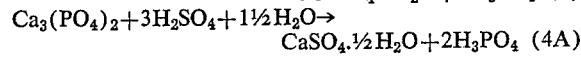

A typical integrated process embodying the invention and incorporating the two-stage concentration procedure particularly described in the specification of said co-pending application No. 507,012 filed on Nov. 9, 1965, is illustrated in diagrammatic flowsheet form in the single figure of the accompanying drawing. In this process, ground phosphate rock and substantially sulphate-free orthophosphoric acid solution are mixed in a digestion system 1 on a continuous basis and the liquid product of the digestion reaction is fed, separated from gangue sludge by a combination of decantation, filtration and washing for (simplicity only the filter 2 of the separation system is shown), to a crystallizer wherein strong sulphuric acid is added; the mixture of crystals and liquid is drawn from the crystallizer 3, separated in a filter 4 and washed.

The gangue sludge produced by digestion typically contains silica, magnesium fluoride, sodium and potassium fluosilicates, and other matter.

The filtration of the liquid/crystal mixture in filter 4 and the washing of the crystals produces a Building Grade Gypsum saleable as such; the filtrate contains approximately 40% $P_2O_5$ w./w. as a phosphoric acid solution of utility for the direct production of fertilizer compositions, e.g. diammonium phosphate and a filtrate discharge for such purposes is shown at 5.

At least a portion of such filtrate is fed as feedstock to the inlet 6 of a submerged heater or like first evaporator apparatus 7 and concentrated therein to about 80% $P_2O_5$ w./w.; phosphoric acid vapour distilling in the gaseous effluent of the evaporator is condensed and recovered, as indicated at 8 and as explained in the aforesaid specification, as a chemically pure acid at a strength of up to about 70% $P_2O_5$ w./w. in an amount corresponding to about 15% of the feedstock $P_2O_5$ content.

The filtration of the liquid/crystal mixture in filter 4 is drawn off at outlet 9 and passed to dilution tank 10 where it is diluted to a $P_2O_5$ content of about 65% w./w. and filtered in filter 11. As indicated, some of the concentrated acid product of the evaporator apparatus 7 may be discharged at 9a as a feed to certain fertilizer manufacturing processes. The solids removed are washed with water to recover free phosphoric acid thereon and the washings are added to the filtrate. The washed solids are then either fused and calcined with potassium chloride to produce potassium metaphosphate or are digested with hydrochloric acid and the resultant solution subjected to solvent extraction or to ion-exchange processes to recover pure phosphoric acid solution (for addition, e.g. to the acid condensed from the evaporator effluent).

The filtrate (including the washings) is substantially sulphate-free and has a $P_2O_5$ content of about 60% w./w. and part is recycled over line 12 to the digestion system 1 as the acid feed thereto. The remainder of the filtrate can be utilized as a source of relatively pure phosphoric acid, but in this embodiment of the invention is fed to a second evaporator apparatus 13, conveniently a submerged heater or like evaporator apparatus, and reconcentrated to a desired high $P_2O_5$, e.g. 80% w./w. Phosphoric acid distilling in the gaseous effluent of such evaporator 13 is condensed, and recovered as a side stream of chemically pure acid, along with the phosphoric acid vapour in the effluent of the first evaporator apparatus 7.

The evaporator gaseous effluents are then treated by equipment (not shown), as disclosed in the specification of co-pending application No. 440,185 filed on Mar. 16, 1965, and issued on Oct. 4, 1966, as U.S. Patent 3,276,510, which achieves recovery of phosphorus compounds remaining in the effluent and also, if desired, recovery of fluosilicic acid ($H_2SiF_6$) by equipment indicated at 14.

As indicated in the drawing, fluorine evolved in the reactions in the digestion system 1 and in the crystallizer 3 may be passed by lines 15, 16 to the equipment 14 for recovery as fluosilicic acid.

We claim:
1. The process comprising digesting ground phosphate rock with substantially sulphate-free orthophosphoric acid in an amount to convert the calcium values of the rock to soluble monocalcium phosphate; separating the liquid from the solid products of such digestion; adding sulphuric acid to such liquid in an amount to convert the monocalcium phosphate content of such liquid to calcium sulphate and orthophosphoric acid and causing the calcium sulphate to crystallize; filtering the resultant mixture; feeding at least part of the filtrate as feedstock to a submerged heating apparatus and concentrating such feedstock to a $P_2O_5$ content not less than about 80% w./w.; diluting the acid product of such evaporator to filterable viscosity; filtering the diluted product; and utilizing at least a portion of the filtrate for the digestion of further ground phosphate rock.

References Cited

UNITED STATES PATENTS 2,897,053   7/1959   Svanoe   23—165
2,899,292   8/1959   Vickery   23—109 X
3,316,061   4/1967   Csendes et al.   23—165

OTHER REFERENCES

Perry (Editor), Chem. Engrs. Handbook, third edit. (1950), p. 979 relied on.

OSCAR R. VERTIZ, *Primary Examiner.*

A. GREIF, *Assistant Examiner.*

PO-1050
(5/69)

UNITED STATES PATENT OFFICE
CERTIFICATE OF CORRECTION

Patent No. 3,442,610  Dated May 6, 1969

Inventor(s) WILLIAM ROY MUSTIAN, JR., ET AL.

It is certified that error appears in the above-identified patent and that said Letters Patent are hereby corrected as shown below:

In the Specification, Column 4, line 1 should appear:
-- The acid product of the first evaporator apparatus 7 --.
Column 4, line 12, "resutlant" should read -- resultant --.
Column 4, line 14, "additin" should read -- addition --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents